US012525195B2

(12) United States Patent
Keum et al.

(10) Patent No.: US 12,525,195 B2
(45) Date of Patent: Jan. 13, 2026

(54) SCAN DRIVING CIRCUIT, DISPLAY DEVICE AND METHOD OF OPERATING THE DISPLAY DEVICE

(71) Applicant: Samsung Display Co., Ltd., Yongin-Si (KR)

(72) Inventors: Nackhyeon Keum, Yongin-si (KR); Jae-Jin Song, Yongin-si (KR); Kwangsae Lee, Yongin-si (KR)

(73) Assignee: Samsung Display Co., Ltd., Yongin-Si (KR)

( * ) Notice: Subject to any disclaimer, the term of this patent is extended or adjusted under 35 U.S.C. 154(b) by 45 days.

(21) Appl. No.: 18/604,499

(22) Filed: Mar. 14, 2024

(65) Prior Publication Data

US 2024/0428740 A1 Dec. 26, 2024

(30) Foreign Application Priority Data

Jun. 23, 2023 (KR) ........................ 10-2023-0081412

(51) Int. Cl.
*G09G 3/3266* (2016.01)
*G09G 3/3233* (2016.01)

(52) U.S. Cl.
CPC ......... *G09G 3/3266* (2013.01); *G09G 3/3233* (2013.01); *G09G 2300/0819* (2013.01); *G09G 2300/0842* (2013.01); *G09G 2310/08* (2013.01); *G09G 2330/021* (2013.01)

(58) Field of Classification Search
CPC ............... G09G 3/3266; G09G 3/3233; G09G 2300/0819; G09G 2300/0842; G09G 2310/08; G09G 2330/021
See application file for complete search history.

(56) References Cited

U.S. PATENT DOCUMENTS

| | | | | |
|---|---|---|---|---|
| 10,302,985 | B1 | 5/2019 | Gong | |
| 12,288,522 | B1 * | 4/2025 | Yang | G09G 3/3258 |
| 2019/0114980 | A1 * | 4/2019 | Kim | G02F 1/136213 |
| 2023/0014107 | A1 * | 1/2023 | Kitsomboonloha | G09G 3/3266 |
| 2023/0110320 | A1 * | 4/2023 | Shin | G09G 3/3266 345/691 |

FOREIGN PATENT DOCUMENTS

KR 10-2015-0097955 A 8/2015

* cited by examiner

*Primary Examiner* — Benjamin C Lee
*Assistant Examiner* — Nathan P Brittingham
(74) *Attorney, Agent, or Firm* — Innovation Counsel LLP

(57) ABSTRACT

Disclosed is a scan driving circuit that includes an input transistor, an output transistor, and a discharge control transistor. The input transistor is connected between an input terminal, that receives a start signal, and a first node. The input transistor includes a gate electrode connected to a clock terminal. The output transistor is connected between an output terminal, that outputs a scan signal, and a first voltage terminal. The output transistor includes a gate electrode connected to the first node. The discharge control transistor is connected between the first node and a second voltage terminal, and includes a gate electrode connected to the second voltage terminal. Each frame of a second plurality of frames of the start signal includes an address period and a self-scan period. In the address period, a discharge voltage provided to the second voltage terminal is a high voltage. In the self-scan period, a voltage level of the discharge voltage is lower than a voltage level of the high voltage.

26 Claims, 9 Drawing Sheets

SCAN DRIVING CIRCUIT, DISPLAY DEVICE AND METHOD OF OPERATING THE DISPLAY DEVICE

CROSS-REFERENCE TO RELATED APPLICATIONS

This application claims priority under 35 U.S.C. § 119 to Korean Patent Application No. 10-2023-0081412 filed on Jun. 23, 2023, in the Korean Intellectual Property Office, the disclosures of which are incorporated by reference herein in their entireties.

BACKGROUND

Embodiments of the present disclosure relate to a display device, and more particularly, relate to a display device including a scan driving circuit.

An electronic device, which provides an image to a user, such as a smartphone, a digital camera, a notebook computer, a navigation system, a monitor, or a smart television includes a display device for displaying the image. The display device generates an image and provides the user with the generated image through a display screen.

The display device includes a display panel and a driving controller for controlling the display panel. As the driving controller provides data signals to the display panel and currents corresponding to the data signals are provided to pixels of the display panel, a given image may be displayed.

SUMMARY

Embodiments of the present disclosure may provide a scan driving circuit capable of reducing power consumption and a display device including the same.

According to an embodiment, a scan driving circuit includes: an input transistor connected between an input terminal, that receives a start signal, and a first node, the input transistor includes a gate electrode connected to a clock terminal; an output transistor connected between an output terminal, that outputs a scan signal, and a first voltage terminal, the output transistor includes a gate electrode connected to the first node; and a discharge control transistor connected between the first node and a second voltage terminal, the discharge control transistor includes a gate electrode connected to the second voltage terminal. Each of frame of a second plurality of frames of the start signal includes an address period and a self-scan period. In the address period, a discharge voltage provided to the second voltage terminal is a high voltage. In the self-scan period, a voltage level of the discharge voltage is lower than a voltage level of the high voltage.

In an embodiment, in the address period, a clock signal provided to the clock terminal may be a signal that switches between the high voltage and a first low voltage, and in the self-scan period, the clock signal may be maintained at the high voltage.

In an embodiment, in the self-scan period, the discharge voltage may be a second low voltage lower than the first low voltage.

In an embodiment, in the self-scan period, the output transistor and the discharge control transistor may maintain a turn-on state.

In an embodiment, in the self-scan period, the scan signal may be maintained at a first low voltage.

In an embodiment, when a driving frequency of the start signal is a first frequency, each frame of a first plurality of frames includes the address period. When the driving frequency of the start signal is a second frequency lower than the first frequency, the each frame of the second plurality of frames may include the address period and the self-scan period.

According to an embodiment, a display device may include a display panel that includes a pixel, a driving controller that receives an input image signal and outputs an output image signal, a data driving circuit that outputs a data signal corresponding to the output image signal, a scan driving circuit that provides a first scan signal to the pixel, and a voltage generator that provides a first low voltage and a discharge voltage in response to a voltage control signal. The driving controller may provide the voltage generator with the voltage control signal for selecting a voltage level of the discharge voltage and may provide the scan driving circuit with a start signal and a clock signal. Each frame of a second plurality of frames of the start signal may include an address period and a self-scan period. The discharge voltage may be a high voltage in the address period and may be a second low voltage lower than the first low voltage in the self-scan period. The scan driving circuit may output the first scan signal in response to the start signal, the clock signal, and the discharge voltage. In the self-scan period, the scan driving circuit may maintain the first scan signal at the first low voltage in response to the discharge voltage.

In an embodiment, the scan driving circuit may include: an input transistor connected between an input terminal, that receives the start signal, and a first node, the input transistor may include a gate electrode connected to a clock terminal receiving the clock signal; an output transistor connected between an output terminal, that outputs the first scan signal, and a first voltage terminal, that receives the first low voltage, the output transistor includes a gate electrode connected to the first node; and a discharge control transistor connected between the first node and a second voltage terminal that receives the discharge voltage, the discharge transistor includes a gate electrode connected to the second voltage terminal.

In an embodiment, in the address period, the clock signal provided to the clock terminal may be a signal that switches between the high voltage and the first low voltage, and in the self-scan period, the clock signal may be maintained at the high voltage.

In an embodiment, in the self-scan period, the discharge voltage may be the second low voltage lower than the first low voltage.

In an embodiment, in the self-scan period, the output transistor and the discharge control transistor may maintain a turn-on state.

In an embodiment, when a driving frequency of the start signal is a first frequency, each frame of a first plurality of frames may include the address period. When the driving frequency of the start signal is a second frequency lower than the first frequency, the each frame of the second plurality of frames may include the address period and the self-scan period.

In an embodiment, the pixel may include: a light emitting element; a first pixel transistor including a first electrode, a second electrode connected to the light emitting element, and a gate electrode; a second pixel transistor connected between the first electrode of the first pixel transistor and a data line, that receives the data signal, the second pixel transistor includes a gate electrode that receives a second scan signal different from the first scan signal; and a third pixel transistor connected between the gate electrode of the first pixel transistor and a voltage line, that receives an initialization voltage, the third pixel transistor includes a gate electrode that receives the first scan signal.

In an embodiment, the scan driving circuit may include a first scan driving circuit that provides the first scan signal, and a second scan driving circuit that provides the second scan signal.

In an embodiment, in the address period, the first scan signal may be activated to a level to turn on the third pixel transistor, and the second scan signal may be activated to a level to turn on the second pixel transistor.

In an embodiment, in the self-scan period, the first scan signal may be maintained at an inactive level, and the second scan signal may be activated to a level to turn on the second pixel transistor.

According to an embodiment, a display device may include a display panel including a pixel, a scan driving circuit that provides a scan signal to the pixel, and an emission driving circuit that provides an emission signal to the pixel. The pixel may include a light emitting element, a first pixel transistor that includes a first electrode, a second electrode connected to the light emitting element, and a gate electrode, a second pixel transistor that is connected between the gate electrode of the first pixel transistor and a voltage line receiving an initialization voltage and including a gate electrode receiving the scan signal, and a third pixel transistor that is connected between a first driving voltage line receiving a first driving voltage and the first electrode of the first pixel, and includes a gate electrode for receiving the emission signal. The scan driving circuit may include; an input transistor that is connected between an input terminal, that receives a start signal, and a first node, the input transistor includes a gate electrode connected to a clock terminal; an output transistor that is connected between an output terminal, that outputs the scan signal, and a first voltage terminal, the output transistor includes a gate electrode connected to the first node; and a discharge control transistor that is connected between the first node and a second voltage terminal, the discharge transistor includes a gate electrode connected to the second voltage terminal. In a first mode, each of the second pixel transistor and the third pixel transistor may be turned on, and a discharge voltage provided to the second voltage terminal may be a high voltage. In a second mode, the second pixel transistor may be turned off, the third pixel transistor is turned on, and a voltage level of the discharge voltage may be lower than a voltage level of the high voltage.

In an embodiment, in the second mode, the output transistor and the discharge control transistor may maintain a turn-on state.

In an embodiment, in the second mode, the scan signal may be maintained at a first low voltage.

In an embodiment, in the first mode, a clock signal provided to the clock terminal may be a signal that switches between the high voltage and the first low voltage, and in the second mode, the clock signal may be maintained at the high voltage.

According to an embodiment, a method of operating a display device which includes a scan driving circuit may include generating a start signal, a clock signal, and a voltage control signal, generating a first low voltage and a discharge voltage in response to the voltage control signal, generating a first scan signal in response to the start signal, the clock signal, the first low voltage, and the discharge voltage, and displaying an image in response to the first scan signal and a data signal. Each of a plurality of frames of the start signal may include an address period and a self-scan period. The discharge voltage may be a high voltage in the address period and may be a second low voltage lower than the first low voltage in the self-scan period. The scan driving circuit may include a discharge control transistor that maintains a first node at the discharge voltage during the self-scan period, and an output transistor that discharges the first scan signal to the first low voltage in response to the discharge voltage of the first node.

In an embodiment, the generating of the start signal, the clock signal, and the voltage control signal may include generating the clock signal swinging between the high voltage and the first low voltage during the address period, and maintaining the clock signal at the high voltage during the self-scan period.

In an embodiment, the operating method further includes generating a second scan signal different from the first scan signal.

In an embodiment, the display panel may further include a pixel, and the pixel may include a light emitting element, a first pixel transistor that includes a first electrode, a second electrode connected to the light emitting element, and a gate electrode, a second pixel transistor that is connected between the first electrode of the first pixel transistor and a data line receiving the data signal and including a gate electrode that receives the second scan signal, and a third pixel transistor that is connected between the gate electrode of the first pixel transistor and a voltage line receiving an initialization voltage and including a gate electrode receiving the first scan signal.

In an embodiment, the generating of the first scan signal may include activating the first scan signal such that the third pixel transistor is turned on during the address period, and activating the second scan signal such that the second pixel transistor is turned on during the address period.

In an embodiment, the generating of the first scan signal may further include maintained the first scan signal at an inactive level during the self-scan period, and activating the second scan signal such that the second pixel transistor is turned on during the self-scan period.

BRIEF DESCRIPTION OF THE FIGURES

The above and other objects and features of the present disclosure will become apparent by describing in detail embodiments thereof with reference to the accompanying drawings.

DETAILED DESCRIPTION

Figure 1:
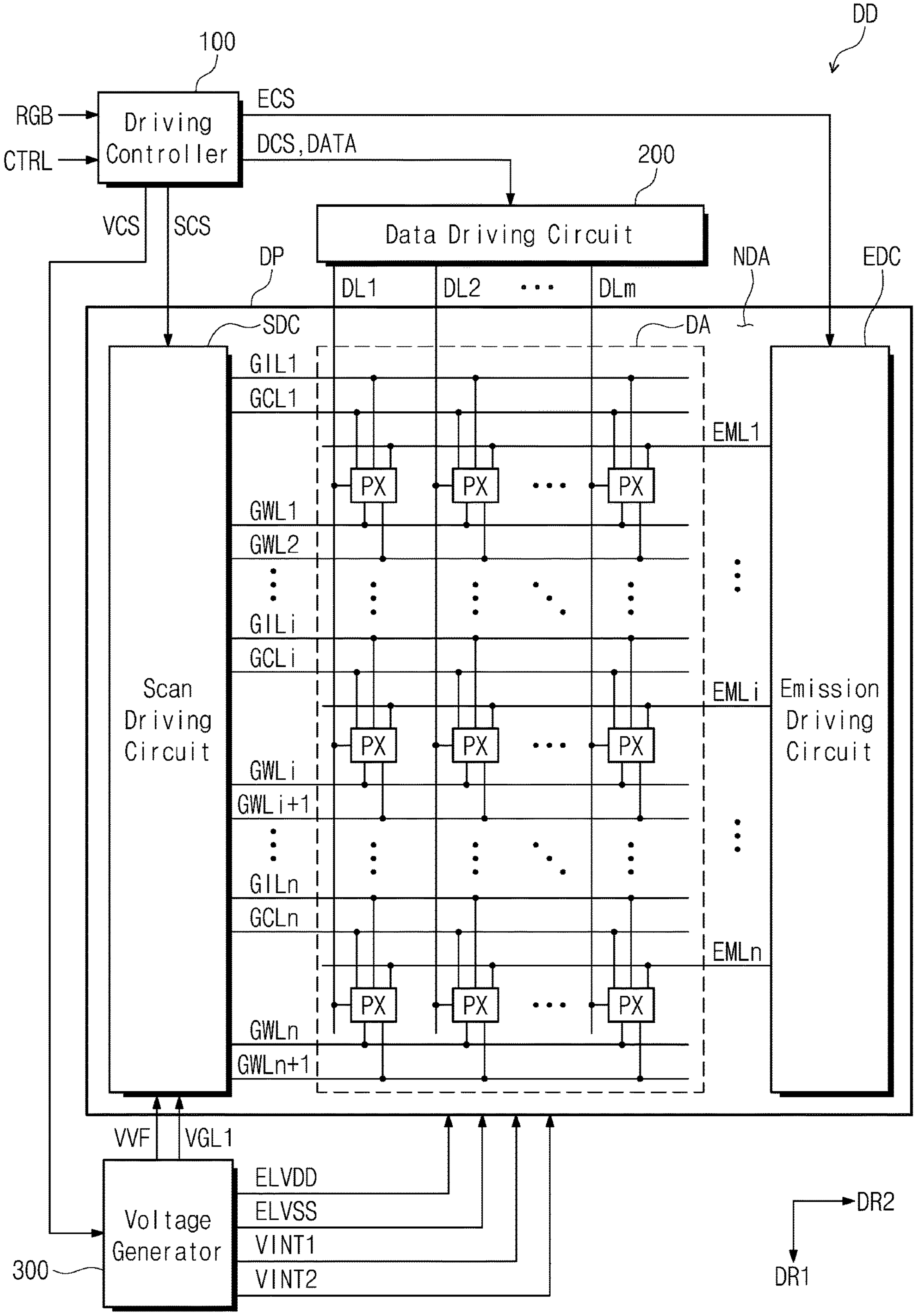
FIG. 1 is a block diagram of a display device according to an embodiment of the present disclosure.

In the specification, the expression that a first component (or region, layer, part, etc.) is "on", "connected to", or "coupled to" a second component means that the first component is directly on, connected to, or coupled to the second component or means that a third component is interposed therebetween.

The same reference numerals/signs refer to the same components. Also, in drawings, the thickness, ratio, and dimension of components are exaggerated for effectiveness of description of technical contents.

The terms "first", "second", etc. are used to describe various components, but the components are not limited by the terms. The terms are only used to distinguish one component from another component. For example, without departing from the scope and spirit of the invention, a first component may be referred to as a "second component", and similarly, the second component may be referred to as the "first component". The articles "a", "an", and "the" are singular in that they have a single referent, but the use of the singular form in the specification should not preclude the presence of more than one referent.

Also, the terms "under", "beneath", "on", "above", etc. are used to describe a relationship between components illustrated in a drawing. The terms are relative and are described with reference to a direction indicated in the drawing.

It will be understood that the terms "include", "comprise", "have", etc. specify the presence of features, numbers, steps, operations, elements, or components, described in the specification, or a combination thereof, not precluding the presence or additional possibility of one or more other features, numbers, steps, operations, elements, or components or a combination thereof.

Unless otherwise defined, all terms (including technical terms and scientific terms) used in this specification have the same meaning as commonly understood by those skilled in the art to which the present disclosure belongs. Furthermore, terms such as terms defined in the dictionaries commonly used should be interpreted as having a meaning consistent with the meaning in the context of the related technology, and should not be interpreted in ideal or overly formal meanings unless explicitly defined herein.

Below, embodiments of the present disclosure will be described with reference to drawings.

FIG. 1 is a block diagram of a display device according to an embodiment of the present disclosure.

Referring to FIG. 1, a display device DD includes a display panel DP, a driving controller 100, a data driving circuit 200, a scan driving circuit SDC, an emission driving circuit EDC, and a voltage generator 300.

The driving controller 100 receives an input image signal RGB and a control signal CTRL. The driving controller 100 generates an output image signal DATA corresponding to the input image signal RGB. The driving controller 100 outputs a scan control signal SCS, a data control signal DCS, an emission control signal ECS, and a voltage control signal VCS.

The driving controller 100 according to an embodiment of the present disclosure may output the voltage control signal VCS depending on driving frequency information included in the control signal CTRL.

The data driving circuit 200 receives the data control signal DCS and the output image signal DATA from the driving controller 100. The data driving circuit 200 converts the output image signal DATA into data signals and then outputs the data signals to a plurality of data lines DL1 to DLm to be described later.

The voltage generator 300 generates voltages necessary for the operation of the display device DD. In an embodiment, the voltage generator 300 generates a first driving voltage ELVDD, a second driving voltage ELVSS, a first initialization voltage VINT1, a second initialization voltage VINT2, a first low voltage VGL1, and a discharge voltage VVF. In an embodiment, the first driving voltage ELVDD, the second driving voltage ELVSS, the first initialization voltage VINT1, and the second initialization voltage VINT2 may be provided to the display panel DP, and the first low voltage VGL1 and the discharge voltage VVF may be provided to the scan driving circuit SDC.

The display panel DP includes scan lines GIL1 to GILn, GCL1 to GCLn, and GWL1 to GWLn+1, emission control lines EML1 to EMLn, the data lines DL1 to DLm, and pixels PX.

The display panel DP may include a display area DA and a non-display area NDA. The pixels PX are disposed in the display area DA. The scan driving circuit SDC and the emission driving circuit EDC may be disposed in the non-display area NDA of the display panel DP. In an embodiment, the scan driving circuit SDC is disposed adjacent to the first side of the display area DA. The scan lines GIL1 to GILn, GCL1 to GCLn, and GWL1 to GWLn+1 extend from the scan driving circuit SDC in a second direction DR2.

The emission driving circuit EDC is disposed adjacent to the second side of the display area DA. The emission control lines EML1 to EMLn extend from the emission driving circuit EDC in a direction facing away from the second direction DR2.

The scan lines GIL1 to GILn, GCL1 to GCLn, and GWL1 to GWLn+1 and the emission control lines EML1 to EMLn are arranged to be spaced from each other in a first direction DR1. The data lines DL1 to DLm extend from the data driving circuit 200 in the first direction DR1 and are arranged to be spaced from each other in the second direction DR2.

In the example illustrated in FIG. 1, the scan driving circuit SDC and the emission driving circuit EDC are arranged to face each other, with the pixels PX interposed therebetween, but the present disclosure is not limited thereto. For example, the scan driving circuit SDC and the emission driving circuit EDC may be disposed adjacent to each other on the first side or the second side of the display area DA. In an embodiment, the scan driving circuit SDC and the emission driving circuit EDC may be implemented with one circuit.

The plurality of pixels PX are electrically connected to the scan lines GIL1 to GILn, GCL1 to GCLn, and GWL1 to GWLn+1, the emission control lines EML1 to EMLn, and the data lines DL1 to DLm. Each of the plurality of pixels PX may be electrically connected to four scan lines and one emission control line. For example, as illustrated in FIG. 1, the pixels PX belonging to the first row may be connected to the scan lines GIL1, GCL1, GWL1, and GWL2 and the emission control line EML1. Also, the pixels PX belonging to the i-th row may be connected to the scan lines GILi, GCLi, GWLi, and GWLi+1 and the emission control line EMLi. The pixels PX belonging to the n-th row may be connected to the scan lines GILn, GCLn, GWLn, and GWLn+1 and the emission control line EMLn.

Each of the plurality of pixels PX includes a light emitting element ED (refer to FIG. 3) and a pixel circuit PXC (refer to FIG. 3) controlling the emission of the light emitting element ED. The pixel circuit PXC may include one or more pixel transistors and one or more capacitors. The scan driving circuit SDC and the emission driving circuit EDC may include transistors formed through the same process as the pixel circuit PXC.

Each of the plurality of pixels PX receives the first driving voltage ELVDD, the second driving voltage ELVSS, the first initialization voltage VINT1, and the second initialization voltage VINT2 from the voltage generator 300.

The scan driving circuit SDC receives the scan control signal SCS from the driving controller 100 and receives the discharge voltage VVF and the first low voltage VGL1 from the voltage generator 300. The scan driving circuit SDC may output scan signals to the scan lines GIL1 to GILn, GCL1 to GCLn, and GWL1 to GWLn+1 in response to the scan control signal SCS. A circuit configuration and an operation of the scan driving circuit SDC will be described in detail later.

Figure 2:
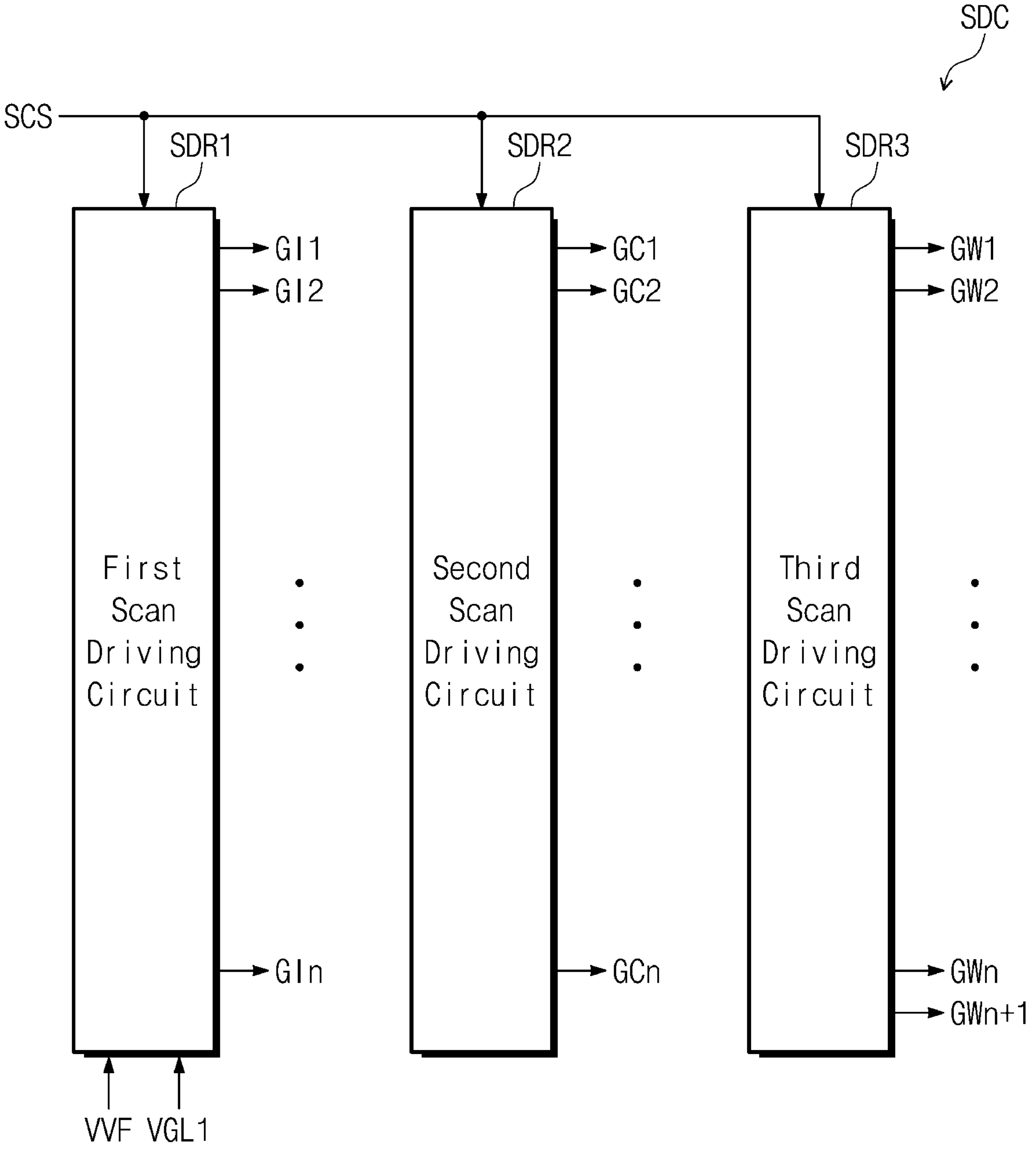
FIG. 2 is a block diagram illustrating a scan driving circuit illustrated in FIG. 1.

FIG. 2 is a block diagram illustrating the scan driving circuit SDC illustrated in FIG. 1.

Referring to FIG. 2, the scan driving circuit SDC includes a first scan driving circuit SDR1, a second scan driving circuit SDR2, and a third scan driving circuit SDR3. In response to the scan control signal SCS, the first scan driving circuit SDR1 outputs scan signals GI1 to GIn to be provided to the scan lines GIL1 to GILn illustrated in FIG. 1. In an embodiment, the first scan driving circuit SDR1 may operate in response to the discharge voltage VVF such that the scan signals GI1 to GIn are discharged. In response to the scan control signal SCS, the second scan driving circuit SDR2 outputs scan signals GC1 to GCn to be provided to the scan lines GCL1 to GCLn illustrated in FIG. 1. In response to the scan control signal SCS, the third scan driving circuit SDR3 outputs scan signals GW1 to GWn+1 to be provided to the scan lines GWL1 to GWLn+1 illustrated in FIG. 1.

Figure 3:
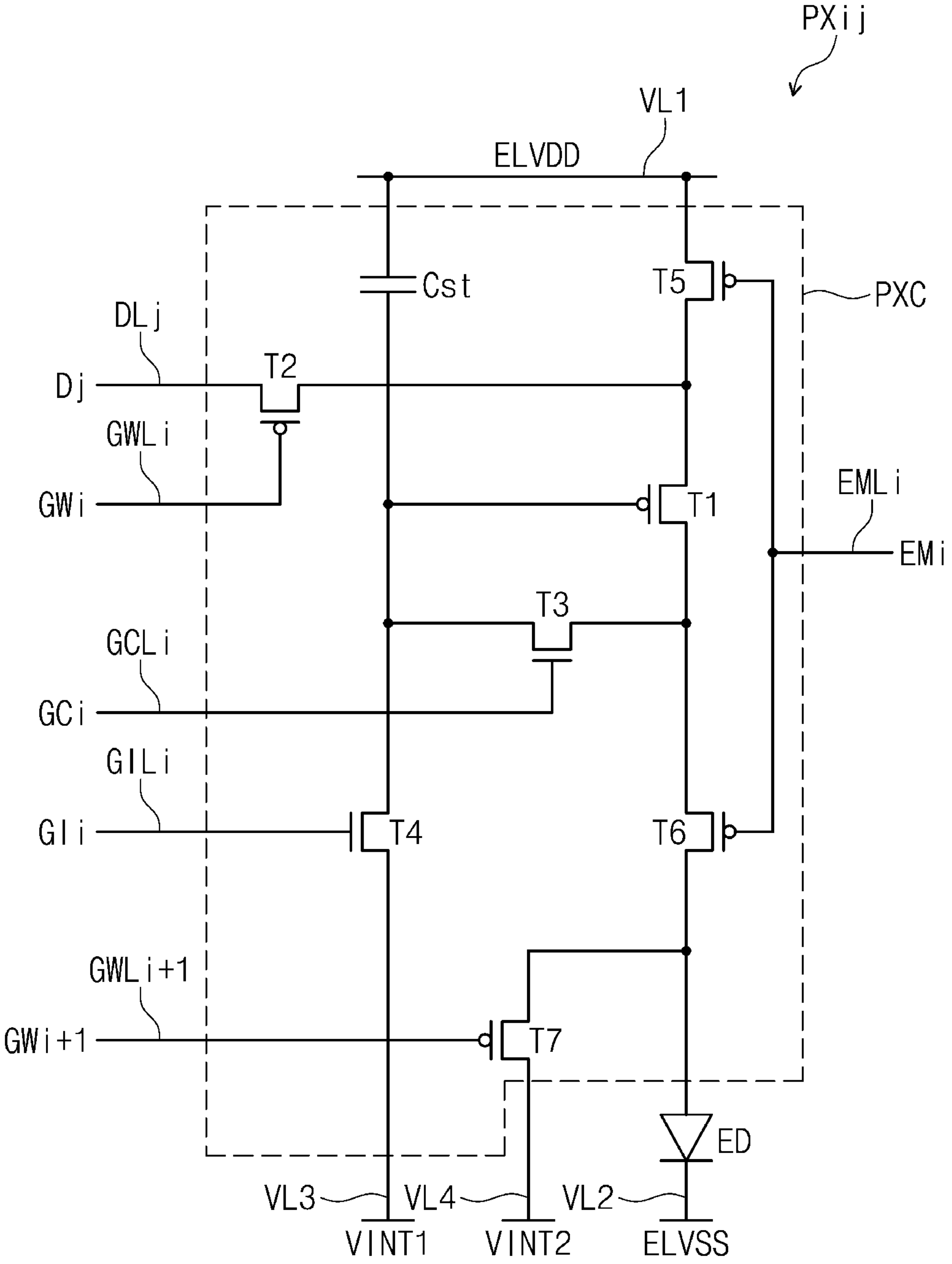
FIG. 3 is a circuit diagram of a pixel according to an embodiment of the present disclosure.

FIG. 3 is a circuit diagram of a pixel PXij according to an embodiment of the present disclosure.

The pixel PXij that is connected to the j-th data line DLi among the data lines DL1 to DLm (refer to FIG. 1), the i-th scan lines GILi, GCLi, and GWLi and the (i+1)-th scan line GWLi+1 among the scan lines GIL1 to GILn, GCL1 to GCLn, and GWL1 to GWLn+1 (refer to FIG. 1), and the i-th emission control line EMLi among the emission control lines EML1 to EMLn (refer to FIG. 1) is illustrated in FIG. 3 as an example.

Each of the plurality of pixels PX illustrated in FIG. 1 may have the same circuit configuration as the pixel PXij illustrated in FIG. 3. In a display device according to an embodiment, the pixel PXij includes the pixel circuit PXC and at least one light emitting element ED. In an embodiment, the light emitting element ED may be an organic light emitting diode. The pixel circuit PXC includes first to seventh pixel transistors T1, T2, T3, T4, T5, T6, and T7 and a capacitor Cst.

In an embodiment, the third and fourth pixel transistors T3 and T4 among the first to seventh pixel transistors T1 to T7 are N-type transistors that use an oxide semiconductor as a semiconductor layer, and each of the first, second, fifth, sixth, and seventh pixel transistors T1, T2, T5, T6, and T7 is a P-type transistor including a low-temperature polycrystalline silicon (LTPS) semiconductor layer. However, the present disclosure is not limited thereto. In an embodiment, all of the first to seventh pixel transistors T1 to T7 may be P-type transistors or N-type transistors. In an embodiment, at least one of the first to seventh pixel transistors T1 to T7 may be an N-type transistor, and the others thereof may be P-type transistors. Also, a circuit configuration of a pixel according to the present disclosure is not limited to FIG. 3. The pixel circuit PXC illustrated in FIG. 3 is provided only as an example, and the configuration of the pixel circuit PXC may be modified and implemented.

The i-th scan lines GILi, GCLi, and GWLi may respectively transfer the i-th scan signals GIi, GCi, and GWi, and the (i+1)-th scan line GWLi+1 may transfer the (i+1)-th scan signal GWj+1. The i-th emission control line EMLi transfers the i-th emission signal EMi, and the j-th data line DLj transfers the j-th data signal Dj. In the following description, the j-th data signal Dj is referred to as a "data signal Dj", the i-th scan lines GILi, GCLi, and GWLi are referred to as "scan lines GILi, GCLi, and GWLi", the (i+1)-th scan line GWLi+1 is referred to as a "scan line GWLi+1", and the i-th emission control line EMLi is referred to as an "emission control line EMLi".

The data signal Dj may have a voltage level corresponding to the output image signal DATA output from the driving controller 100 (refer to FIG. 1) or a voltage level corresponding to a bias voltage. The bias voltage will be described in detail later. First to fourth driving voltage lines VL1, VL2, VL3, and VL4 may respectively transfer the first driving voltage ELVDD, the second driving voltage ELVSS, the first initialization voltage VINT1, and the second initialization voltage VINT2.

The first pixel transistor T1 includes a first electrode electrically connected to the first driving voltage line VL1 through the fifth pixel transistor T5, a second electrode electrically connected to an anode of the light emitting element ED through the sixth pixel transistor T6, and a gate electrode connected to a first end of the capacitor Cst. The first pixel transistor T1 may provide the light emitting element ED with a current corresponding to the data signal Dj that is transferred through the data line DLj depending on a switching operation of the second pixel transistor T2.

The second pixel transistor T2 includes a first electrode connected to the data line DLj, a second electrode connected to the first electrode of the first pixel transistor T1, and a gate electrode connected to the scan line GWLi. The second pixel transistor T2 may be turned on depending on the scan signal GWi transferred through the scan line GWLi and may transfer the data signal Dj from the data line DLj to the first electrode of the first pixel transistor T1.

The third pixel transistor T3 includes a first electrode connected to the gate electrode of the first pixel transistor T1, a second electrode connected to the second electrode of the first pixel transistor T1, and a gate electrode connected to the scan line GCLi. The third pixel transistor T3 may be turned on depending on the scan signal GCi transferred through the scan line GCLi, and thus, the gate electrode and the second electrode of the first pixel transistor T1 may be connected to each other, that is, the first pixel transistor T1 may be diode-connected.

The fourth pixel transistor T4 includes a first electrode connected to the gate electrode of the first pixel transistor T1, a second electrode connected to the third driving voltage line VL3 through which the first initialization voltage VINT1 is transferred, and a gate electrode connected to the scan line GILi. The fourth pixel transistor T4 may be turned on depending on the scan signal GIi transferred through the scan line GILi, and thus, the first initialization voltage VINT1 may be transferred to the gate electrode of the first pixel transistor T1. As such, a voltage of the gate electrode of the first pixel transistor T1 may be initialized. This operation may be referred to as an "initialization operation".

The fifth pixel transistor T5 includes a first electrode connected to the first driving voltage line VL1, a second electrode connected to the first electrode of the first pixel transistor T1, and a gate electrode connected to the emission control line EMLi.

The sixth pixel transistor T6 includes a first electrode connected to the second electrode of the first pixel transistor T1, a second electrode connected to the anode of the light emitting element ED, and a gate electrode connected to the emission control line EMLi.

The fifth pixel transistor T5 and the sixth pixel transistor T6 may be simultaneously turned on depending on the emission control signal EMi transferred through the emission control line EMLi. As such, the first driving voltage ELVDD may be compensated for through the diode-connected first pixel transistor T1 so as to be supplied to the light emitting element ED.

The seventh pixel transistor T7 includes a first electrode connected to the second electrode of the sixth pixel transistor T6, a second electrode connected to the fourth driving voltage line VL4, and a gate electrode connected to the scan line GWLi+1. The seventh pixel transistor T7 is turned on depending on the scan signal GWi+1 transferred through the scan line GWLi+1 and bypasses a current of the anode of the light emitting element ED to the fourth driving voltage line VL4.

The first end of the capacitor Cst is connected to the gate electrode of the first pixel transistor T1 as described above, and a second end of the capacitor Cst is connected to the first driving voltage line VL1. A cathode of the light emitting element ED may be connected to the second driving voltage line VL2 transferring the second driving voltage ELVSS. The pixel PXij according to an embodiment is not limited to the circuit illustrated in FIG. 3. In the pixel PXij, the number of pixel transistors, the number of capacitors, and a connection relationship of the transistors and the capacitors may be variously changed or modified.

Figure 4:
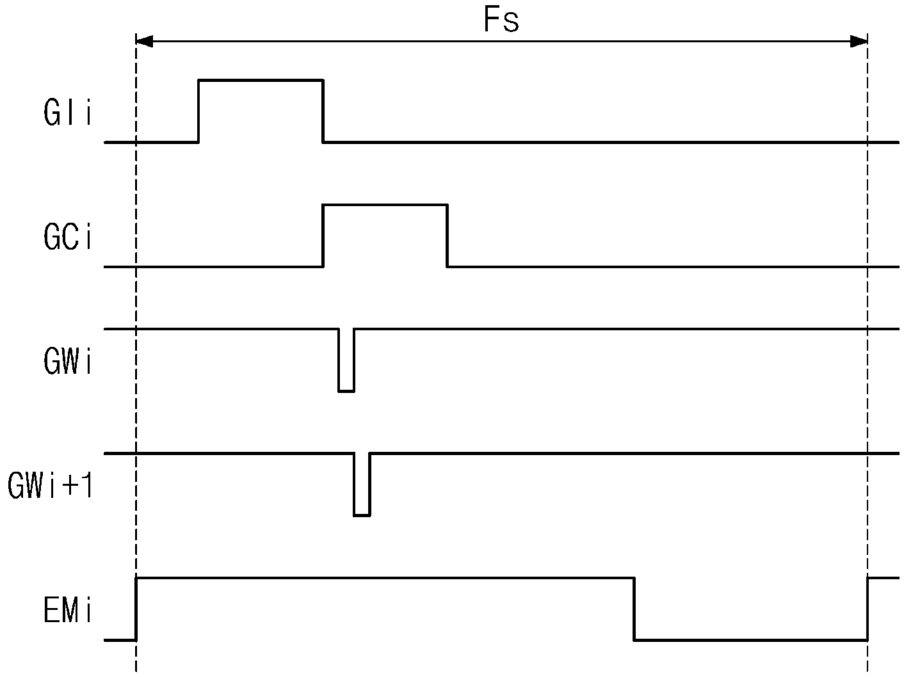
FIG. 4 is a timing diagram for describing an operation of a pixel illustrated in FIG. 3.

FIG. 4 is a timing diagram for describing an operation of a pixel illustrated in FIG. 3. An operation of a display device according to an embodiment will be described with reference to FIGS. 3 and 4.

Referring to FIGS. 3 and 4, the scan signal GIi of the high level is provided through the scan line GILi during an initialization period within one frame Fs. When the fourth pixel transistor T4 is turned on in response to the scan signal GIi of the high level, the first initialization voltage VINT1 is supplied to the gate electrode of the first pixel transistor T1 through the fourth pixel transistor T4. The gate electrode of the first pixel transistor T1 may be initialized with the first initialization voltage VINT1.

Next, when the scan signal GCi of the high level is supplied through the scan line GCLi during a data programming and compensation period, the third pixel transistor T3 is turned on. The first pixel transistor T1 is diode-connected by the third pixel transistor T3 thus turned on and is forward-biased. In this case, the second pixel transistor T2 is turned on by the scan signal GWi of the low level. As such, a compensation voltage that is obtained by subtracting the threshold voltage of the first pixel transistor T1 from the voltage of the data signal Dj supplied from the data line DLj is applied to the gate electrode of the first pixel transistor T1. That is, a gate voltage applied to the gate electrode of the first pixel transistor T1 may be the compensation voltage.

The first driving voltage ELVDD and the compensation voltage are respectively applied to opposite ends of the capacitor Cst, and charges corresponding to a voltage difference of the opposite ends of the capacitor Cst may be stored in the capacitor Cst.

Meanwhile, the seventh pixel transistor T7 is turned on in response to the scan signal GWi+1 of the low level transferred through the scan line GWLi+1. A portion of the current of the anode of the light emitting element ED may be drained through the seventh pixel transistor T7 as a bypass current.

Even in the case where the light emitting element ED emits a light under the condition that a minimum current of the first pixel transistor T1 flows as a driving current for the purpose of displaying a black image, the black image may not be normally displayed. Accordingly, the seventh pixel transistor T7 of the pixel PXij according to an embodiment of the present disclosure may drain a portion of the minimum current of the first pixel transistor T1 to a current path, which is different from a current path to the light emitting element ED, as the bypass current. Herein, the minimum current of the first pixel transistor T1 means a current flowing under the condition that a gate-source voltage of the first pixel transistor T1 is smaller than the threshold voltage, that is, the first pixel transistor T1 is turned off. As a minimum driving current (e.g., a current of 10 pA or less) is transferred to the light emitting element ED, with the first pixel transistor T1 turned off, an image of black luminance is expressed. When the minimum driving current for displaying a black image flows, the influence of the bypass transfer of the bypass current is great; in contrast, when the large driving current for displaying an image such as a normal image or a white image flows, there may be almost no influence of the bypass current. Accordingly, when a driving current for displaying a black image flows, a light emitting current of the light emitting element ED, which corresponds to a result of subtracting the bypass current drained through the seventh pixel transistor T7 from a driving current, may have a minimum current amount to such an extent as to accurately express a black image. Accordingly, a contrast ratio may be improved by accurately implementing an image of black luminance by using the seventh pixel transistor T7. In an embodiment, a bypass signal for turning on the seventh pixel transistor T7 is the scan signal GWi+1 of the low level, but the present disclosure is not limited thereto.

Next, during an emission period, the emission control signal EMi supplied from the emission control line EMLi transitions from the high level to the low level. During the emission period, the fifth pixel transistor T5 and the sixth pixel transistor T6 are turned on by the emission control signal EMi of the low level. In this case, the driving current according to a voltage difference between the gate voltage of the gate electrode of the first pixel transistor T1 and the first driving voltage ELVDD is generated and supplied to the light emitting element ED through the sixth pixel transistor T6, and thus, the current flows through the light emitting element ED. Therefore, the light emitting element ED may emit a light with luminance corresponding to the current.

Figure 5:
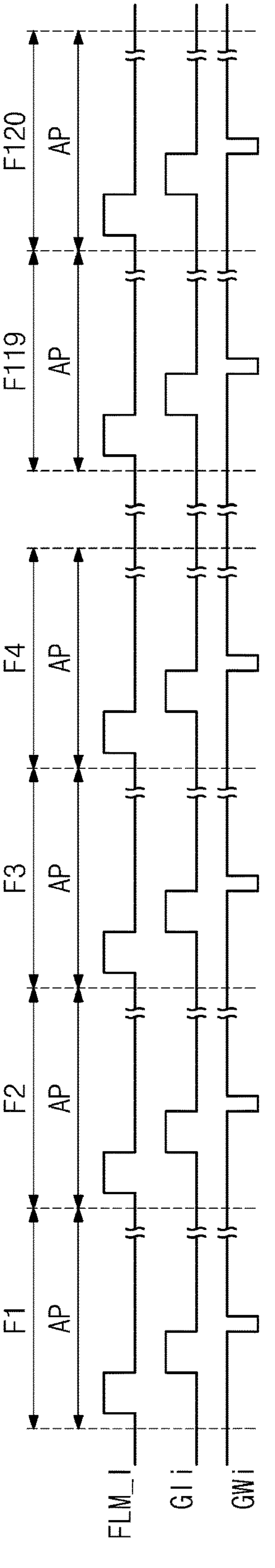
FIG. 5 is a timing diagram for describing an operation of a pixel illustrated in FIG. 3 when a driving frequency is a first frequency.

FIG. 5 is a timing diagram for describing an operation of the pixel PXij illustrated in FIG. 3 when a driving frequency is a first frequency. An operation of the display device DD according to an embodiment will be described with reference to FIGS. 2, 3, and 5.

Referring to FIGS. 2, 3, and 5, when a driving frequency is a first frequency, for example, 120 Hz, the pixel PXij may sequentially operate from a first frame F1 to a 120th frame F120.

The first scan driving circuit SDR1 of the scan driving circuit SDC outputs the scan signal GIi in response to a start signal FLM_I included in the scan control signal SCS provided from the driving controller 100 (refer to FIG. 1). The start signal FLM_I may transition to the active level, that is, the high level in each of the first to 120th frames F1 to F120.

The first scan driving circuit SDR1 of the scan driving circuit SDC outputs the scan signal GIi in response to a start signal FLM_I included in the scan control signal SCS provided from the driving controller 100 (refer to FIG. 1).

The third scan driving circuit SDR3 of the scan driving circuit SDC may output the scan signal GWi in response to the scan control signal SCS provided from the driving controller 100 (refer to FIG. 1).

Although the scan signal GCi is not illustrated in FIG. 5, the second scan driving circuit SDR2 of the scan driving circuit SDC may output the scan signal GCi in response to the scan control signal SCS provided from the driving controller 100 (refer to FIG. 1).

In an address period AP, when the scan signal GWi transitions to the low level, the data signal Dj transferred through the data line DLj may be provided to the first electrode of the first pixel transistor T1. The data signal Dj provided through the data line DLj in the address period AP may be a signal corresponding to the output image signal DATA provided from the driving controller 100 (refer to FIG. 1).

Each of the first frame F1 to the 120th frame F120 may be called the address period AP or the active period in which the data signal Dj is provided to the pixel PXij. Accordingly, each of the first frame F1 to the 120th frame F120 may be the same as the address period AP.

Figure 6:
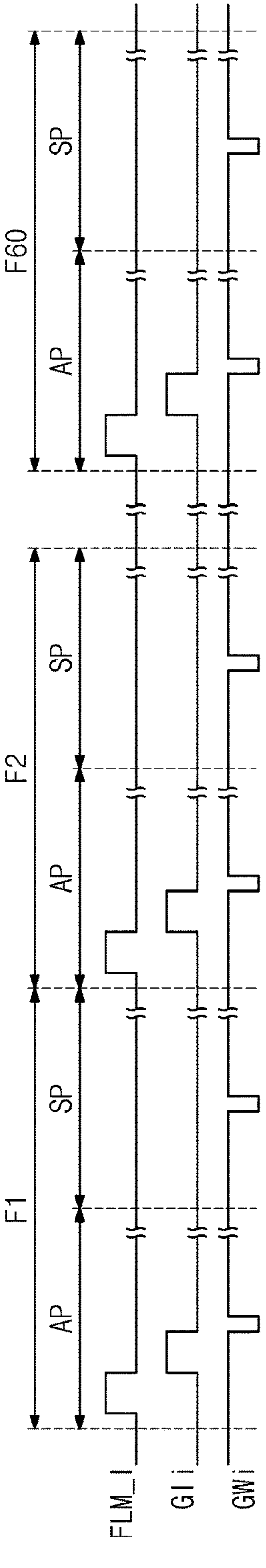
FIG. 6 is a timing diagram for describing an operation of a pixel illustrated in FIG. 3 when a driving frequency is a second frequency.

FIG. 6 is a timing diagram for describing an operation of the pixel PXij illustrated in FIG. 3 when a driving frequency is a second frequency. An operation of the display device DD according to an embodiment will be described with reference to FIGS. 2, 3, and 6.

Referring to FIGS. 2, 3, and 6, when a driving frequency is a second frequency, for example, 60 Hz, the pixel PXij may sequentially operate from a first frame F1 to a 60th frame F60.

The first scan driving circuit SDR1 of the scan driving circuit SDC outputs the scan signal GIi in response to the start signal FLM_I included in the scan control signal SCS provided from the driving controller 100 (refer to FIG. 1). The start signal FLM_I may be activated to the high level in each of the first to 60th frames F1 to F60.

Each of the first frame F1 to the 60th frame F60 may include the address period AP (or the active period or a first mode) and a self-scan period SP (or a second mode). When the driving frequency is 60 Hz, in the address period AP of each of the first frame F1 to the 60th frame F60, the operation of the pixel PXij is the same as that in the address period AP of each of the first frame F1 to the 120th frame F120.

In the self-scan period SP of each of the first frame F1 to the 60th frame F60, the scan signal GIi may be maintained at the inactive level, that is, the low level. In the self-scan period SP, when the scan signal GWi transitions to the low level, the data signal Dj transferred through the data line DLj may be provided to the first electrode of the first pixel transistor T1. In the self-scan period SP, the data signal Dj provided through the data line DLj may correspond to a bias signal for initializing the first electrode of the first pixel transistor T1.

Although the scan signal GCi is not illustrated in FIG. 6, like the scan signal Gli, the scan signal GCi may transition to the high level in the address period AP once and may be maintained at the inactive level, that is, the low level in the self-scan period SP.

Figure 7:
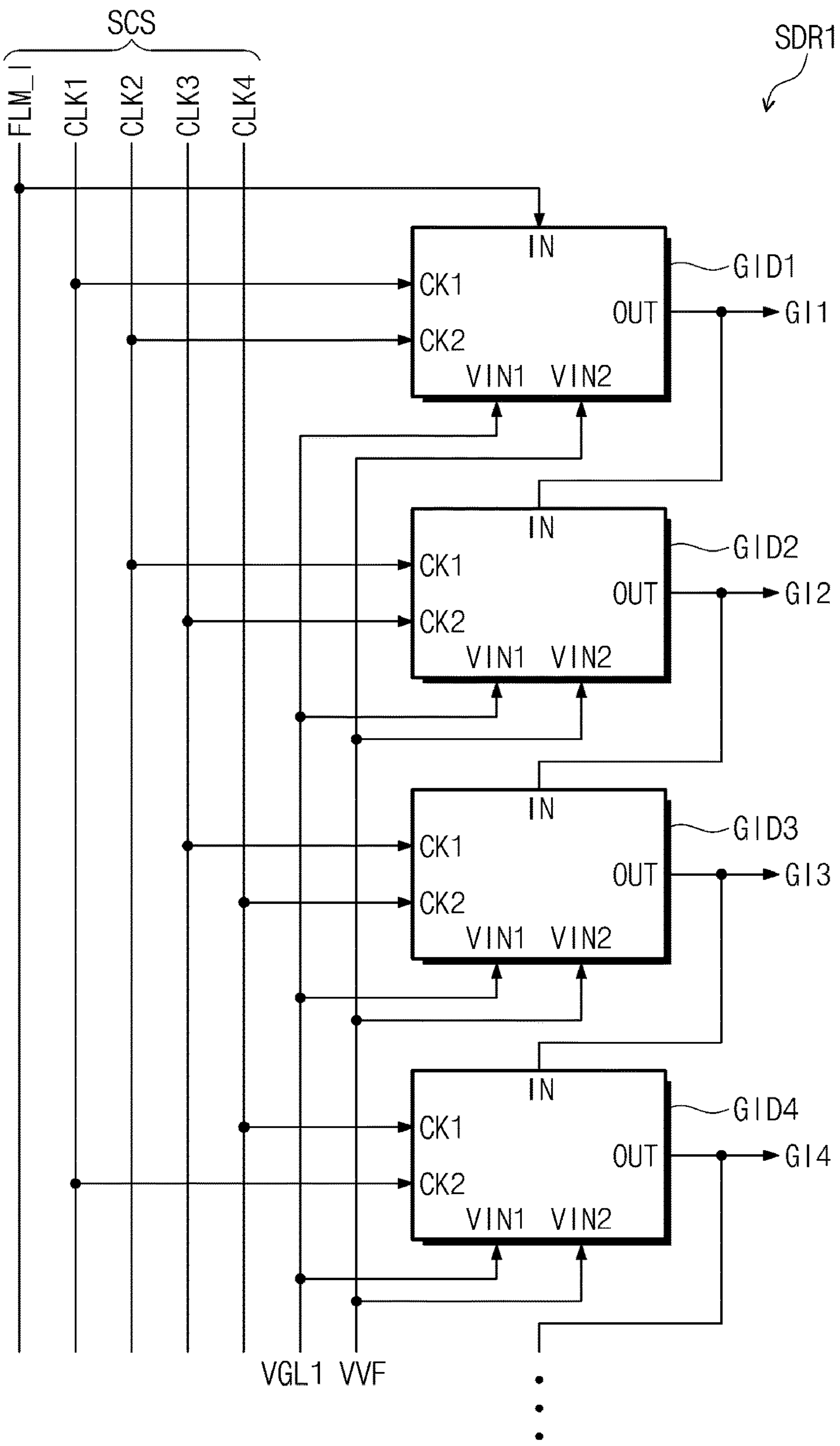
FIG. 7 is a block diagram of a first scan driving circuit illustrated in FIG. 2.

FIG. 7 is a block diagram of the first scan driving circuit SDR1 illustrated in FIG. 2.

Referring to FIG. 7, the scan driving circuit SDC includes driving stages GID1, GID2, GID3, and GID4. Each of the driving stages GID1, GID2, GID3, and GID4 may include an input terminal IN, a first clock terminal CK1, a second clock terminal CK2, and an output terminal OUT.

The driving stages GID1, GID2, GID3, and GID4 respectively output the scan signals GI1, GI2, GI3, and GI4 to the output terminals OUT in response to the scan control signal SCS. The scan signals GI1, GI2, GI3, and GI4 may be provided to the pixels PX illustrated in FIG. 1. Only 4 driving stages GID1, GID2, GID3, and GID4 are illustrated in FIG. 7, but the number of driving stages that the scan driving circuit SDC includes may be determined depending on the number of rows of the pixels PX disposed in the display panel DP (refer to FIG. 1). For example, when the pixels PX are disposed at n rows, the scan driving circuit SDC may include n driving stages.

The scan control signal SCS may include the start signal FLM_I and first to fourth clock signals CLK1, CLK2, CLK3, and CLK4. An example in which the scan control signal SCS includes 4 clock signals, that is, the first to fourth clock signals CLK1, CLK2, CLK3, and CLK4 is illustrated in FIG. 7, but the present disclosure is not limited thereto.

The driving stage GID1 among the driving stages GID1, GID2, GID3, and GID4 receives the start signal FLM_I through the input terminal IN.

The driving stages GID2, GID3, and GID4 respectively receive outputs of previous driving stages, that is, the scan signals GI1, GI2, and GI3. For example, the driving stage GID2 receives the scan signal GI1 through the input terminal IN, the driving stage GID3 receives the scan signal GI2 through the input terminal IN, and the driving stage GID4 receives the scan signal GI3 through the input terminal IN.

Each of the driving stages GID1, GID2, GID3, and GID4 receives two corresponding clock signals among the first to fourth clock signals CLK1, CLK2, CLK3, and CLK4 through the first and second clock terminals CK1 and CK2. For example, the driving stage GID1 may receive the first and second clock signals CLK1 and CLK2, the driving stage GID2 may receive the second and third clock signals CLK2 and CLK3, the driving stage GID3 may receive the third and fourth clock signals CLK3 and CLK4, and the driving stage GID4 may receive the fourth and first clock signals CLK4 and CLK1.

Each of the driving stages GID1, GID2, GID3, and GID4 receives the first low voltage VGL1 and the discharge voltage VVF through a first voltage terminal VIN1 and a second voltage terminal VIN2.

In an embodiment, the second scan driving circuit SDR2 illustrated in FIG. 2 may include the circuit configuration as the first scan driving circuit SDR1 illustrated in FIG. 7.

Figure 8:
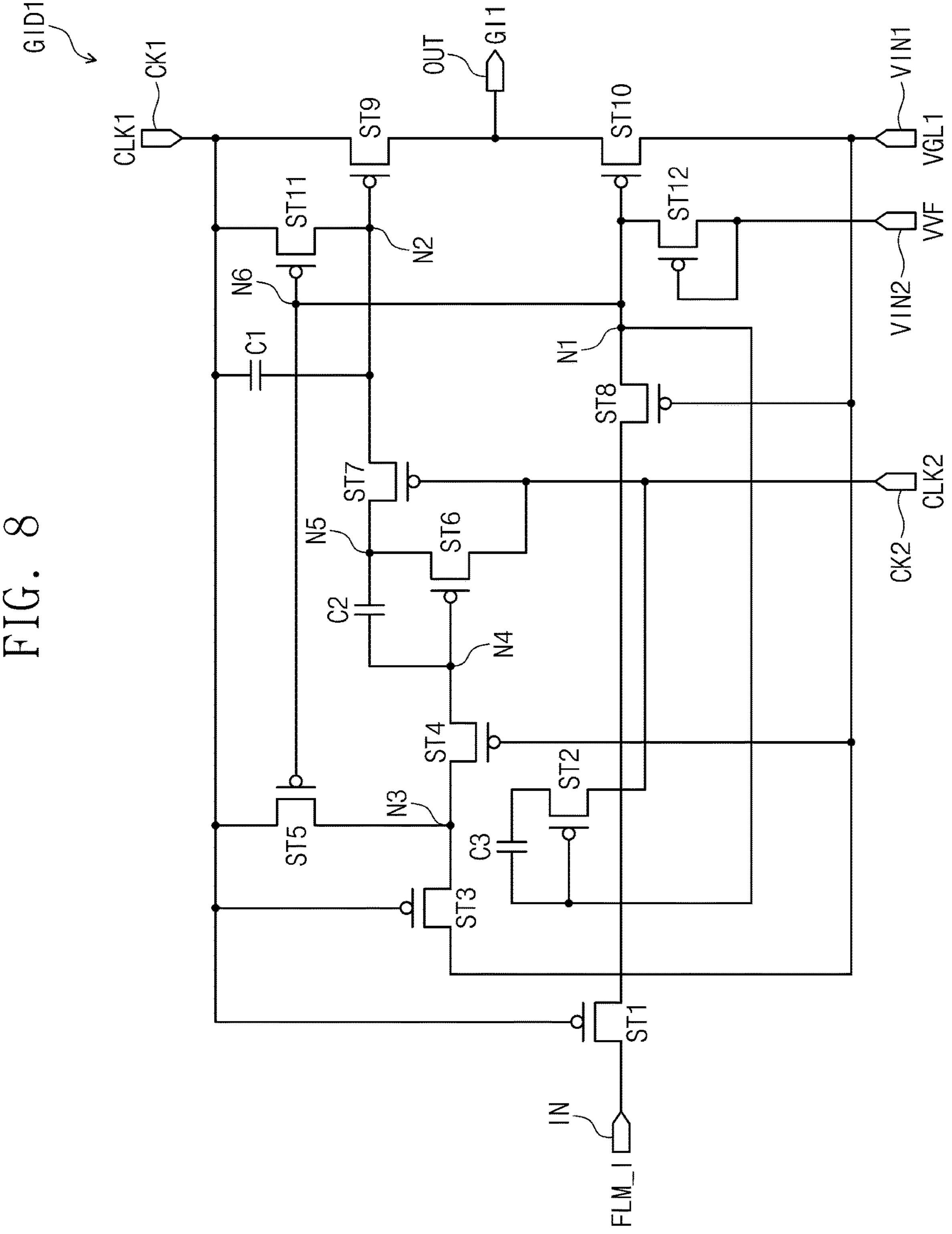
FIG. 8 is a circuit diagram of a driving stage illustrated in FIG. 7.

FIG. 8 is a circuit diagram of the driving stage GID1 illustrated in FIG. 7.

The driving stages GID2, GID3, and GID4 illustrated in FIG. 7 may include the same circuit configuration as the driving stage GID1 illustrated in FIG. 8.

Referring to FIG. 8, the driving stage GID1 receives the start signal FLM_I through the input terminal IN, receives the first and second clock signals CLK1 and CLK2 through the first and second clock terminals CK1 and CK2, and outputs the scan signal GI1 to the output terminal OUT. The driving stage GID1 receives the first low voltage VGL1 through the first voltage terminal VIN1 and receives the discharge voltage VVF through the second voltage terminal VIN2.

The driving stage GID1 includes first to twelfth transistors ST1, ST2, ST3, ST4, ST5, ST6, ST7, ST8, ST9, ST10, ST11, and ST12 and first to third capacitors C1, C2, and C3. In an embodiment, all of the first to twelfth transistors ST1, ST2, ST3, ST4, ST5, ST6, ST7, ST8, ST9, ST10, ST11, and ST12 may be P-type transistors. However, the present disclosure is not limited thereto. The driving stage GID1 illustrated in FIG. 8 is provided only as an example, and the circuit configuration of the driving stage GID1 may be variously modified and implemented.

In an embodiment, the first transistor ST1, the tenth transistor ST10, and the twelfth transistor ST12 may be respectively referred to as an "input transistor", an "output transistor", and a "discharge control transistor".

The first transistor ST1 and the eighth transistor ST8 are connected sequentially, that is, in series between the input terminal IN and a first node N1. A gate electrode of the first transistor ST1 is connected to the first clock terminal CK1, and a gate electrode of the eighth transistor ST8 is connected to the first voltage terminal VIN1. The second transistor ST2 is connected between a first electrode of the third capacitor C3 and the second clock terminal CK2 and includes a gate electrode connected to a second electrode of the third capacitor C3.

The third transistor ST3 is connected between a third node N3 and the first voltage terminal VIN1 and includes a gate electrode connected to the first clock terminal CK1. The fourth transistor ST4 is connected between the third node N3 and a fourth node N4 and includes a gate electrode connected to the first voltage terminal VIN1. The fifth transistor ST5 is connected between the first clock terminal CK1 and the third node N3 and includes a gate electrode connected to a sixth node N6. The sixth transistor ST6 is connected between a fifth node N5 and the second clock terminal CK2 and includes a gate electrode connected to the fourth node N4. The seventh transistor ST7 is connected between the fifth node N5 and a second node N2 and includes a gate electrode connected to the second clock terminal CK2. The ninth transistor ST9 is connected between the first clock terminal CK1 and the output terminal OUT and includes a gate electrode connected to the second node N2. The tenth transistor ST10 is connected between the output terminal OUT and the first voltage terminal VIN1 and includes a gate electrode connected to the first node N1. The eleventh transistor ST11 is connected between the first clock terminal CK1 and the second node N2 and includes a gate electrode connected to the sixth node N6. The twelfth transistor ST12 is connected between the first node N1 and the second voltage terminal VIN2 and includes a gate electrode connected to the second voltage terminal VIN2.

The first capacitor C1 is connected between the first clock terminal CK1 and the second node N2. The second capacitor C2 is connected between the fourth node N4 and the fifth node N5. The third capacitor C3 includes the first electrode connected to the second transistor ST2 and the second electrode connected to the first node N1.

Figure 9:
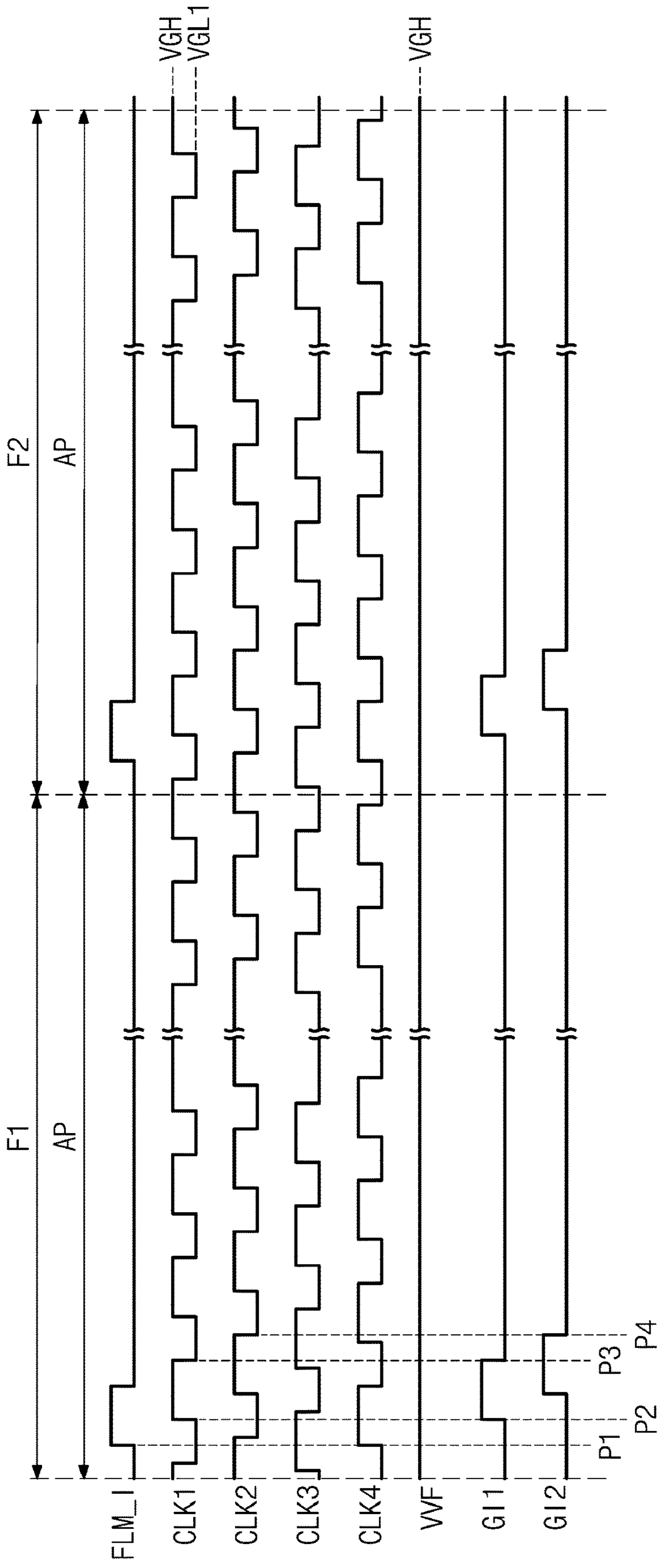
FIG. 9 is a timing diagram for describing an operation of a driving stage illustrated in FIG. 8 when a driving frequency is a first frequency.

FIG. 9 is a timing diagram for describing an operation of the driving stage GID1 illustrated in FIG. 8 when a driving frequency is a first frequency.

Referring to FIGS. 8 and 9, a driving frequency of the start signal FLM_I may be a first frequency. When the first frequency is 120 Hz, a frequency of each of the scan signals GI1 and GI2 may be 120 Hz. Each of the scan signals GI1 and GI2 may transition to the high level once in each of the first frame F1 and the second frame F2.

Because the first clock signal CLK1 is at the low level at a first time point P1 of the first frame F1, the first transistor STi may be turned on, and the start signal FLM_I of the high level may be transferred to the first node N1 through the first and eighth transistors STi and ST8. When a signal of the first node N1 is at the high level, the fifth transistor ST5, the tenth transistor ST10, and the eleventh transistor ST11 maintain a turn-off state. In this case, the second node N2 may be maintained at a previous signal level, that is, the low level through the first capacitor C1. As such, the first clock signal CLK1 of the low level is output as the scan signal GI1 through the ninth transistor ST9. Also, because the first clock signal CLK1 is at the low level, the third transistor ST3 may be turned on, and the first low voltage VGL1 may be transferred to the third node N3 and the fourth node N4.

At a second time point P2, the first clock signal CLK1 transitions from the low level to the high level, and thus, the first transistor ST1 is turned off. In this case, when the second clock signal CLK2 is at the low level, the seventh transistor ST7 is turned on. Because the fifth node N5 is at the low level by the second capacitor C2 and the sixth transistor ST6, the second node N2 may be set to the low level. In this case, as the ninth transistor ST9 is turned on, the first clock signal CLK1 of the high level may be output as the scan signal GI1 through the ninth transistor ST9.

At a third time point P3, because the first clock signal CLK1 transitions from the high level to the low level, the first transistor ST1 may be turned on, and the start signal FLM_I of the low level may be transferred to the first node N1 through the first and eighth transistors ST1 and ST8. Because the tenth transistor ST10 is turned on in response to the low-level signal of the first node N1, the scan signal GI1 transitions to the low level, that is, the first low voltage VGL1.

Because the first node N1 is at the low level, the eleventh transistor ST11 may be turned on, and the first clock signal CLK1 of the low level may be transferred to the second node N2. The scan signal GI1 may be even discharged to the first clock terminal CK1 through the ninth transistor ST9. Therefore, the scan signal GI1 may be quickly discharged to the low level through the first clock terminal CK1 and the first voltage terminal VIN1.

At a fourth time point P4, because the start signal FLM_I is at the low level, the first node N1 may be maintained at the low level. Also, when the second clock signal CLK2 transitions to the low level at the fourth time point P4, the first node N1 may be set to a voltage level, which is lower than the low level of the second clock signal CLK2, by the third capacitor C3. As a result, the voltage of the gate electrode of the tenth transistor ST10, that is, the voltage level of the first node N1 may be maintained at a sufficiently low voltage, and the tenth transistor ST10 may be maintained in a fully turned-on state. Therefore, the scan signal GI1 that is output to the output terminal OUT may be maintained at the low level, that is, the first low voltage VGL1.

At the second frame F2, the driving stage GID1 may operate to be the same as the first frame F1. When the driving frequency is the first frequency (e.g., 120 Hz), each of the first frame F1 and the second frame F2 may be the address period AP.

In an embodiment, when the driving frequency of the start signal FLM_I is the first frequency (e.g., 120 Hz), each of the first to fourth clock signals CLK1, CLK2, CLK3, and CLK4 may be a pulse signal swinging between a high voltage VGH and the first low voltage VGL1.

When the driving frequency of the start signal FLM_I is the first frequency (e.g., 120 Hz), the driving controller 100 illustrated in FIG. 1 may output the voltage control signal VCS such that the discharge voltage VVF is maintained at the high voltage VGH.

When the driving frequency of the start signal FLM_I is the first frequency (e.g., 120 Hz), while the discharge voltage VVF is maintained at the high voltage VGH, the twelfth transistor ST12 is maintained in the turn-off state.

Figure 10:
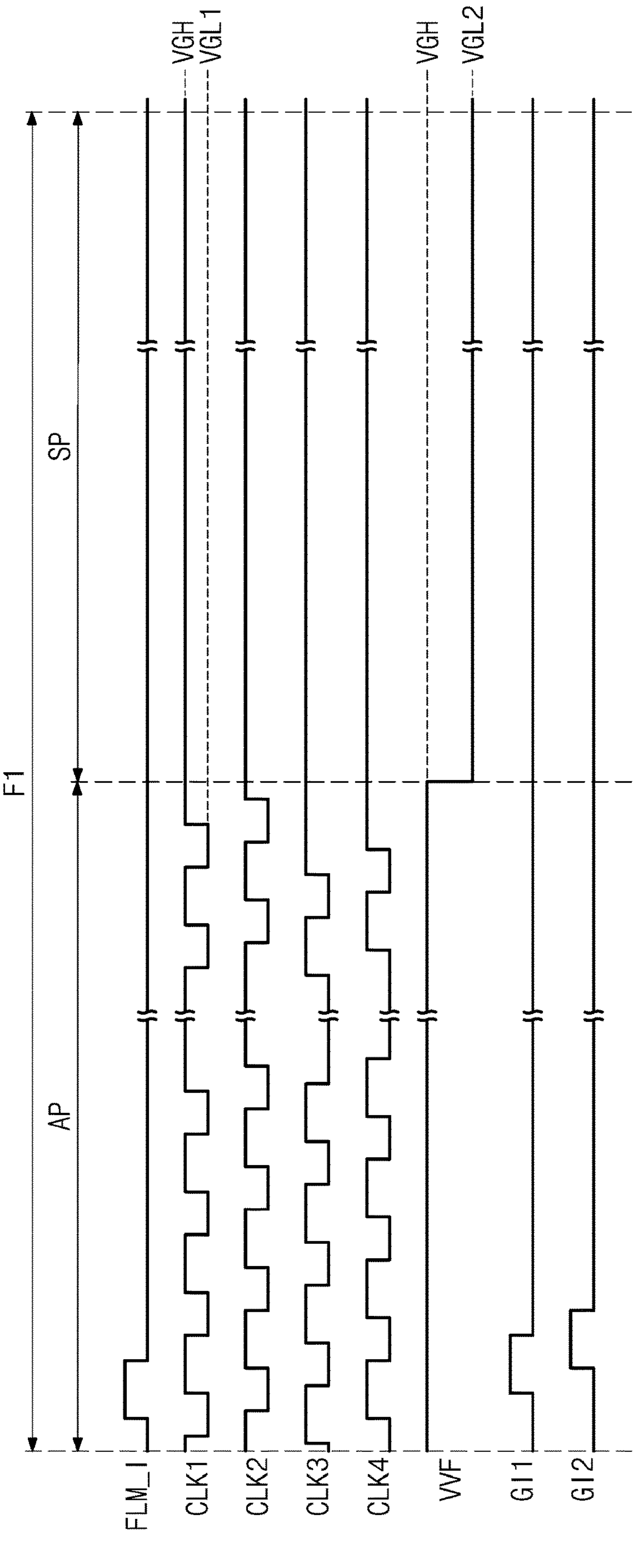
FIG. 10 is a timing diagram for describing an operation of a driving stage illustrated in FIG. 8 when a driving frequency is a second frequency.

FIG. 10 is a timing diagram for describing an operation of the driving stage GID1 illustrated in FIG. 8 when a driving frequency is a second frequency.

Referring to FIGS. 8 and 10, a driving frequency of the start signal FLM_I may be a second frequency. When the second frequency is 60 Hz lower than the first frequency, a frequency of each of the scan signals GI1 and GI2 may be 60 Hz. When the driving frequency is the second frequency (e.g., 60 Hz), the first frame F1 may include the address period AP and the self-scan period SP. Each of the scan signals GI1 and GI2 may transition to the high level once in each of the address period AP of the first frame F1.

The operation of the driving stage GID1 in the address period AP of the first frame F1 when the driving frequency is the second frequency (e.g., 60 Hz) may be the same as the operation of the driving stage GID1 in the address period AP of the first frame F1 when the driving frequency is the first frequency (e.g., 120 Hz) (refer to FIG. 9).

When the driving frequency is the second frequency (e.g., 60 Hz), each of the first to fourth clock signals CLK1, CLK2, CLK3, and CLK4 may be maintained at the high voltage VGH in the self-scan period SP of the first frame F1.

When the driving frequency of the start signal FLM_I is the second frequency (e.g., 60 Hz), the driving controller 100 illustrated in FIG. 1 may output the voltage control signal VCS such that the discharge voltage VVF is maintained at the high voltage VGH during the address period AP of the first frame F1.

When the driving frequency of the start signal FLM_I is the second frequency (e.g., 60 Hz), the driving controller 100 illustrated in FIG. 1 may output the voltage control signal VCS such that the discharge voltage VVF is maintained at a second low voltage VGL2 in the self-scan period SP of the first frame F1.

When the discharge voltage VVF is maintained at the second low voltage VGL2, the twelfth transistor ST12 is maintained in a turn-on state. When the twelfth transistor ST12 is turned on, the discharge voltage VVF being the second low voltage VGL2 is transferred to the first node N1 through the twelfth transistor ST12.

As a voltage of the first node N1 is maintained at a voltage level sufficient to turn on the tenth transistor ST10, that is, at the discharge voltage VVF, the scan signal GI1 may be maintained at the first low voltage VGL1.

Even though all of the first to fourth clock signals CLK1, CLK2, CLK3, and CLK4 are maintained at the high voltage VGH in the self-scan period SP, the scan signal GI1 may be maintained at the first low voltage VGL1 by the tenth transistor ST10 and the twelfth transistor ST12.

That is, during the self-scan period SP, the driving stage GID1 may maintain the scan signal GI1 at the first low voltage VGL1 in response to the discharge voltage VVF.

As the first to fourth clock signals CLK1, CLK2, CLK3, and CLK4 are maintained at a given voltage level (e.g., the high voltage VGH) without toggling in the self-scan period SP, power consumption in the driving stage GID1 may be minimized. Therefore, power consumption of the display device DD including the scan driving circuit SDC illustrated in FIG. 2 may be reduced.

According to the above configuration, a clock signal that is provided to a scan driving circuit during a self-scan period may be maintained at a given level without toggling. Therefore, power consumption of the scan driving circuit may be minimized. This may mean that power consumption of a display device including the scan driving circuit is reduced.

While the present disclosure has been described with reference to embodiments thereof, it will be apparent to those of ordinary skill in the art that various changes and modifications may be made thereto without departing from the spirit and scope of the present disclosure as set forth in the following claims.

What is claimed is:

1. A scan driving circuit comprising:

an input transistor connected between an input terminal, that receives a start signal, and a first node, the input transistor includes a gate electrode connected to a clock terminal;

an output transistor connected between an output terminal, that outputs a scan signal, and a first voltage terminal, the output transistor includes a gate electrode connected to the first node; and a discharge control transistor connected between the first node and a second voltage terminal, the discharge control transistor includes a gate electrode connected to the second voltage terminal, wherein each frame of a second plurality of frames of the start signal includes an address period and a self-scan period, wherein, in the address period, a discharge voltage provided to the second voltage terminal is a high voltage, and wherein, in the self-scan period, a voltage level of the discharge voltage is lower than a voltage level of the high voltage.

2. The scan driving circuit of claim 1, wherein, in the address period, a clock signal provided to the clock terminal is a signal that switches between the high voltage and a first low voltage, and wherein, in the self-scan period, the clock signal is maintained at the high voltage.

3. The scan driving circuit of claim 2, wherein, in the self-scan period, the discharge voltage is a second low voltage lower than the first low voltage.

4. The scan driving circuit of claim 1, wherein, in the self-scan period, the output transistor and the discharge control transistor maintain a turn-on state.

5. The scan driving circuit of claim 1, wherein, in the self-scan period, the scan signal is maintained at a first low voltage.

6. The scan driving circuit of claim 1, wherein, when a driving frequency of the start signal is a first frequency, each frame of a first plurality of frames includes the address period, and wherein, when the driving frequency of the start signal is a second frequency lower than the first frequency, the each frame of the second plurality of frames includes the address period and the self-scan period.

7. A display device comprising:

a display panel including a pixel;

a driving controller configured to receive an input image signal and to output an output image signal;

a data driving circuit configured to output a data signal corresponding to the output image signal;

a scan driving circuit configured to provide a first scan signal to the pixel; and a voltage generator configured to provide a first low voltage and a discharge voltage in response to a voltage control signal, wherein the driving controller provides the voltage generator with the voltage control signal for selecting a voltage level of the discharge voltage and provides the scan driving circuit with a start signal and a clock signal, wherein each frame of a second plurality of frames of the start signal includes an address period and a self-scan period, wherein the discharge voltage is a high voltage in the address period and is a second low voltage lower than the first low voltage in the self-scan period, wherein the scan driving circuit outputs the first scan signal in response to the start signal, the clock signal, and the discharge voltage, and wherein, in the self-scan period, the scan driving circuit maintains the first scan signal at the first low voltage in response to the discharge voltage.

8. The display device of claim 7, wherein the scan driving circuit includes:

an input transistor connected between an input terminal, that receives the start signal, and a first node, the input transistor includes a gate electrode connected to a clock terminal that receives the clock signal;

an output transistor connected between an output terminal, that outputs the first scan signal and a first voltage terminal, that receiving the first low voltage, the output transistor includes a gate electrode connected to the first node; and a discharge control transistor connected between the first node and a second voltage terminal that receives the discharge voltage, the discharge control transistor includes a gate electrode connected to the second voltage terminal.

9. The display device of claim 8, wherein, in the address period, the clock signal provided to the clock terminal is a signal that switches between the high voltage and the first low voltage, and wherein, in the self-scan period, the clock signal is maintained at the high voltage.

10. The display device of claim 8, wherein, in the self-scan period, the discharge voltage is the second low voltage lower than the first low voltage.

11. The display device of claim 8, wherein, in the self-scan period, the output transistor and the discharge control transistor maintain a turn-on state.

12. The display device of claim 7, wherein, when a driving frequency of the start signal is a first frequency, each frame of a first plurality of frames includes the address period, and wherein, when the driving frequency of the start signal is a second frequency lower than the first frequency, the each frame of the second plurality of frames includes the address period and the self-scan period.

13. The display device of claim 7, wherein the pixel includes:

a light emitting element;

a first pixel transistor including a first electrode, a second electrode connected to the light emitting element, and a gate electrode;

a second pixel transistor connected between the first electrode of the first pixel transistor and a data line, that receives the data signal, the second pixel transistor includes a gate electrode that receives a second scan signal different from the first scan signal; and a third pixel transistor connected between the gate electrode of the first pixel transistor and a voltage line, that receives an initialization voltage, the third pixel transistor includes a gate electrode that receives the first scan signal.

14. The display device of claim 13, wherein the scan driving circuit includes:

a first scan driving circuit configured to provide the first scan signal; and a second scan driving circuit configured to provide the second scan signal.

15. The display device of claim 14, wherein, in the address period, the first scan signal is activated to a level to turn on the third pixel transistor, and the second scan signal is activated to a level to turn on the second pixel transistor.

16. The display device of claim 14, wherein, in the self-scan period, the first scan signal is maintained at an inactive level, and the second scan signal is activated to a level to turn on the second pixel transistor.

17. A display device comprising:

a display panel including a pixel;

a scan driving circuit configured to provide a scan signal to the pixel; and an emission driving circuit configured to provide an emission signal to the pixel, wherein the pixel includes:

a light emitting element;

a first pixel transistor including a first electrode, a second electrode connected to the light emitting element, and a gate electrode;

a second pixel transistor connected between the gate electrode of the first pixel transistor and a voltage line that receives an initialization voltage, the second pixel transistor includes a gate electrode that receives the scan signal; and a third pixel transistor connected between a first driving voltage line that receives a first driving voltage and the first electrode of the first pixel transistor, the third pixel transistor includes a gate electrode that receives the emission signal, wherein the scan driving circuit includes:

an input transistor connected between an input terminal, that receives a start signal, and a first node, the input transistor includes a gate electrode connected to a clock terminal;

an output transistor connected between an output terminal, that outputs the scan signal, and a first voltage terminal, the output transistor includes a gate electrode connected to the first node; and a discharge control transistor connected between the first node and a second voltage terminal, the discharge control transistor includes a gate electrode connected to the second voltage terminal, wherein, in a first mode, each of the second pixel transistor and the third pixel transistor is turned on, and a discharge voltage provided to the second voltage terminal is a high voltage, and wherein, in a second mode, the second pixel transistor is turned off, the third pixel transistor is turned on, and a voltage level of the discharge voltage is lower than a voltage level of the high voltage.

18. The display device of claim 17, wherein, in the second mode, the output transistor and the discharge control transistor maintain a turn-on state.

19. The display device of claim 17, wherein, in the second mode, the scan signal is maintained at a first low voltage.

20. The display device of claim 19, wherein, in the first mode, a clock signal provided to the clock terminal is a signal that switches between the high voltage and the first low voltage, and wherein, in the second mode, the clock signal is maintained at the high voltage.

21. A method of operating a display device which includes a scan driving circuit, the method comprising:

generating a start signal, a clock signal, and a voltage control signal;

generating a first low voltage and a discharge voltage in response to the voltage control signal;

generating a first scan signal in response to the start signal, the clock signal, the first low voltage, and the discharge voltage; and displaying an image in response to the first scan signal and a data signal, wherein each of a plurality of frames of the start signal includes an address period and a self-scan period, wherein the discharge voltage is a high voltage in the address period and is a second low voltage lower than the first low voltage in the self-scan period, and wherein the scan driving circuit includes:

a discharge control transistor configured to maintain a first node at the discharge voltage during the self-scan period; and an output transistor configured to discharge the first scan signal to the first low voltage in response to the discharge voltage of the first node.

22. The method of claim 21, wherein the generating of the start signal, the clock signal, and the voltage control signal includes:

generating the clock signal swinging between the high voltage and the first low voltage during the address period; and maintaining the clock signal at the high voltage during the self-scan period.

23. The method of claim 21, wherein the operating method further includes:

generating a second scan signal different from the first scan signal.

24. The method of claim 23, wherein the display device further includes a pixel, and wherein the pixel includes:

a light emitting element;

a first pixel transistor including a first electrode, a second electrode connected to the light emitting element, and a gate electrode;

a second pixel transistor connected between the first electrode of the first pixel transistor and a data line receiving the data signal and including a gate electrode connected to the second scan signal; and a third pixel transistor connected between the gate electrode of the first pixel transistor and a voltage line receiving an initialization voltage and including a gate electrode receiving the first scan signal.

25. The method of claim 24, wherein the generating of the first scan signal includes:

activating the first scan signal such that the third pixel transistor is turned on during the address period; and activating the second scan signal such that the second pixel transistor is turned on during the address period.

26. The method of claim 25, wherein the generating of the first scan signal further includes:

maintained the first scan signal at an inactive level during the self-scan period; and activating the second scan signal such that the second pixel transistor is turned on during the self-scan period.

* * * * *